US006865562B2

(12) United States Patent
Fromherz et al.

(10) Patent No.: US 6,865,562 B2
(45) Date of Patent: Mar. 8, 2005

(54) ADAPTIVE CONSTRAINT PROBLEM SOLVING METHOD AND SYSTEM

(75) Inventors: Markus P. J. Fromherz, Palo Alto, CA (US); Warren B. Jackson, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 486 days.

(21) Appl. No.: 09/874,167

(22) Filed: Jun. 4, 2001

(65) Prior Publication Data

US 2002/0184176 A1 Dec. 5, 2002

(51) Int. Cl.[7] ............................................. G06F 15/18
(52) U.S. Cl. ........................ 706/14; 706/12; 706/902
(58) Field of Search ............................. 706/14, 12, 902

(56) References Cited

U.S. PATENT DOCUMENTS

| | | | | |
|---|---|---|---|---|
| 5,493,631 A | * | 2/1996 | Huang et al. | 706/23 |
| 5,590,218 A | * | 12/1996 | Ornstein | 382/157 |
| 5,720,002 A | * | 2/1998 | Wang | 706/25 |
| 5,870,731 A | | 2/1999 | Trif et al. | 706/52 |
| 5,877,954 A | * | 3/1999 | Klimasauskas et al. | 700/29 |
| 6,088,690 A | | 7/2000 | Gounares et al. | 706/13 |
| 6,144,953 A | | 11/2000 | Sorrells et al. | 706/60 |
| 6,269,351 B1 | * | 7/2001 | Black | 706/15 |
| 2002/0059154 A1 | * | 5/2002 | Rodvold | 706/26 |

OTHER PUBLICATIONS

John A. Allen And Steven Minton, Selecting the Right Heuristic Algorithm: Runtime Performance Predictors.
James E. Borrett, Edward P.K. Tsang And Natasha R. Walsh, Adaptive Constraint Satisfaction: The Quickest First Principle, Nov. 13, 1995, pp 1–25.

* cited by examiner

Primary Examiner—Anthony Knight
Assistant Examiner—Joseph P Hirl
(74) Attorney, Agent, or Firm—Linda M. Robb

(57) ABSTRACT

A method for problem solving in a computer system includes an applications module for sending a problem statement to a complexity module. The complexity module configures a solving module with configuration parameters and also determines expected solver behavior. A solving module determines actual solver behavior, determines whether a problem solution has been found, and determines whether to perform a solver iteration step or to request a complexity module to perform an adaptation step.

42 Claims, 7 Drawing Sheets

PROBLEM SOLVER

ADAPTIVE CONSTRAINT PROBLEM SOLVING METHOD AND SYSTEM

CROSS REFERENCE TO RELATED APPLICATIONS

The following copending application, U.S. application Ser. No. 09/874,552, filed Jun. 4, 2001, titled "Method and System for Algorithm Synthesis in Problem Solving", is assigned to the same assignee of the present application. The entire disclosure of this copending application is totally incorporated herein by reference in its entirety.

INCORPORATION BY REFERENCE

The following U.S. patents are fully incorporated herein by reference: U.S. Pat. No. 5,871,731 (Trif et al., "Adaptive Problem Solving Method and System"); U.S. Pat. No. 6,088,690 (Gounares et al., "Method and Apparatus for Adaptively Solving Sequential Problems in a Target System Utilizing Evolutionary Computation Techniques"); and U.S. Pat. No. 6,144,953 (Sorrells et al., "Time-Constrained Inference Strategy for Real-Time Expert Systems").

BACKGROUND OF THE INVENTION

This invention relates generally to the field of computerized problem solving and in particular to a system and method utilizing an adaptive constraint solver for the solution of complex problems in real time, based on predictive complexity models.

In certain control system applications, there exists a significant need for systems which can provide satisfactory decisions in critically time-constrained situations for complex systems having subsystems consisting of many networked sensors and actuators, with each subsystem having control, monitoring and fault diagnosis capabilities. Advances in hardware technology, such as inexpensive processors, low-cost micro-electromechanical systems (MEMS) actuators and sensors, and decreasing communication costs, result in systems with unprecedented reconfigurability, flexibility, and robustness. However, networked embedded applications require decision system technology that combines distributed constraint optimization methods with complexity analysis and learning techniques.

Decision systems for such applications have not kept pace with hardware development. Traditionally, decision systems have utilized special-purpose computer programs dedicated to a single task. In various more recent systems, decision systems have utilized model-based computer programs using generic constraint solving (finding a solution to a constraint problem) techniques executed on a single, high-end processor. For example, a simple constraint problem is "determining a roller velocity (desired solution) such that a sheet in a printing system arrives at the next registration station at the desired time (the objective) and the velocity does not exceed the roller's velocity limit (constraint)." An example of distributed embedded software is control software, such as software that controls a machine's functions and runs on multiple networked processors within a machine, instead of a single PC or work station. Embedded applications, such as machine control, usually deal with complex constraint problems that have to be solved within tight real-time constraints, while embedded processors usually have strong resource limitations, such as a slow central processing unit with limited memory.

Constrained optimization is at the core of many embedded applications. In applications such as planning, scheduling, control, and diagnosis, it is necessary to generate timely and accurate solutions such as operational plans, control inputs, fault hypotheses, and recovery actions. The common task in these applications is to repeatedly find a solution for a given objective, a solution that is achievable within or consistent with the system's constraints. Today, such applications are typically hand-coded programs based on an extensive analysis of a fixed configuration and task of the system. However, in order to provide dynamic reconfiguration and fault-tolerant behavior for future networked embedded systems, as is often required in military applications, many synthesis operations must become part of the software's real-time operations. Although the invention described herein is not limited to military applications, the following discussion will pertain to a military situation for purposes of example only.

For example, military hardware often outlasts the usefulness of its technology. To address this issue, it is desirable to upgrade and repurpose existing systems for new tasks instead of investing in new hardware. An unmanned underwater vehicle, for example, is potentially a multi-purpose undersea platform for weapons deployment, reconnaissance missions, mine sweeping, rescue operations, etc. However, upgrading or repurposing such a vessel with new types of subsystems (weapons, sensors, mine-clearing or rescue equipment) is difficult, as the software has to coordinate and control interactions that are strongly dependent on the type, role, and original configuration of the equipment. Detecting and catching a mine, for example, requires taking into account the constraints of sensors, robotic arms, and propulsion, and the resulting constraint problems can be complex. The constraint problem to be solved repeatedly by the robot controller, for instance, may involve hundreds of nonlinear range, torque, and collision constraints for a modular manipulator, with multiple objectives such as reaching the target while conserving energy and minimizing motor noise. Today, such problems cannot be solved in real-time by existing techniques on embedded processors.

The second example is coordination of a large number of distributed embedded subsystems. For instance, the increasing number of hydrophonic sensors (on the order of 30,000 in a missile launcher-class submarine) used by sonars like Flank Arrays involves complex parallel architectures. Dynamically mapping and optimally reconfiguring huge data arrays, intensive workload, and data flows are known to be highly compute-intensive problems. Solutions must fit spatial constraints like processing units, memory organization and size, communication bandwidth, and data/computation locality, as well as temporal properties such as response times and latencies.

A final example is the distributed, fault-tolerant coordination of multiple vehicles. There are many applications that require the use of on-board solving services, from mission planning to optimal vehicle control. For instance, consider a set of aircraft formations autonomously performing a long-term mission behind the forward-edge battle area. Each formation leader performs the tactical (long-range) commanding of the formation, satisfying interoperability and coordination constraints, while all aircraft perform short-term self-control. Today, tasks such as planning, scheduling, and coordination are essentially performed before the mission. They consist of the generation of position-time trajectories according to mission objectives, specific navigation points, hostile and tactical environment constraints, and data correlation requirements. By solving these tasks dynamically and reactively to environment changes and mission updates, again using model-based techniques, the formation's availability and flexibility could be increased dramatically. This requires that the solvers distributed among the vehicles have the capability to adapt to a variety of objectives (mission goal, rules of engagement, detection avoidance, aircraft interaction, etc.), and that they are able to reconfigure themselves if individual aircraft exhibit reduced capabilities or even are disabled under enemy fire.

One approach that may provide a solution for generating robust reconfigurable software is model-based computing, which involves the explicit representation of and reasoning about a system's capabilities, constraints, and objectives at run-time. Because the system model is separated from task-specific algorithms, it can be changed as the system changes, making applications configuration-independent and fault-tolerant. Employing model-based computing on embedded software networks requires constraint solvers specifically optimized for such networks. The constraint problems to be solved arise from physical systems and thus almost always are large, hybrid (discrete and continuous), and nonlinear. No single solver algorithm can be expected to be suited for all problems. Instead, solvers have to be able to determine the characteristics of a problem and adapt accordingly. Moreover, solvers have to be able to scale to large problems, which typically means approximating or decomposing problems into subproblems.

Applications running on networked embedded systems present constraint solvers with complex constraint problems that cannot be anticipated off-line. At the same time, constraint solvers must execute within stringent resource limitations in an inherently distributed computing environment. Resorting to anytime algorithms to address real-time requirements, for example, is not sufficient to provide acceptable time-bounded solutions. Real-time application software requires on-line, time-bounded solver execution on processor networks with limited computational capabilities, memory, and communication bandwidth. The solvers must conserve resources and proactively allocate their tasks in a way that effectively utilizes the distributed resources of an embedded network within the allotted time. As a service, a solver should also be both application-independent and customizable to the environment. Thus, there is a need for an approach in which constraint solvers are capable of analyzing, learning from, and ultimately adapting to the presented problems.

There have been various approaches in problem solving techniques, such as U.S. Pat. No. 5,870,731 to Trif et al. titled "Adaptive Problem Solving Method and System," which teaches a problem solving method including retrieving a question from a storage device, outputting the question to an output device, receiving an answer from the user, assigning a fuzzy logic coefficient to the answer, and accessing a learning route authority from the storage device to determine the identity of a subsequent question. Answers to questions are learned through user-provided evaluations in a system that is not designed for autonomous, real-time use.

U.S. Pat. No. 6,088,690 to Gounares et al. titled "Method and Apparatus for Adaptively Solving Sequential Problems in a Target System Utilizing Evolutionary Computation Techniques" discloses a system in which chromosomes are applied to a target system one action at a time and the change in properties of the target system is measured after each action is applied. A fitness rating is calculated for each chromosome based on the property changes produced in the target system by the chromosome. The fitness rating calculation is defined so that successive generations of chromosomes will converge upon desired characteristics. This approach is not based on problem analysis and again is not for real-time use.

Finally, U.S. Pat. No. 6,144,953 to Sorrells et al. titled "Time-Constrained Inference Strategy for Real-Time Expert Systems" teaches a control process and an inference network which assign merit values to each inference node of the inference network. The merit values reflect the processing cost of expanding a node to calculate a likelihood value for the proposition that the node represents. The merit values are then used in the control process to determine which of the nodes will be processed first to calculate likelihood values. This establishes a "best-first" control process, which takes account of the processing cost of each node in the inference network to determine which nodes to evaluate first. However, this approach does not provide the capability of learning from, analyzing and adapting to presented problems.

SUMMARY OF THE INVENTION

Briefly stated, and in accordance with one aspect of the present invention, there is presented a method for problem solving for use in a computer system. The method includes an applications module for sending a problem statement containing data associated with a plurality of system operational variables, a plurality of system constraints, and a plurality of task goals to a complexity module. The complexity module configures a solving module with configuration parameters and also determines expected solver behavior. The solving module determines actual solver behavior, determines whether a problem solution has been found, and determines whether to perform a solver iteration step or to request a complexity module to perform an adaptation step. If a solver iteration step is selected, a new actual solver behavior is determined. When an adaptation step is selected, the complexity module modifies the configuration parameters, configures the solving module with the modified configuration parameters, and determines expected solver behavior. The iteration and adaptation steps are repeated until a problem solution is found.

In another form, the invention comprises a computer system for problem solving, including an input device, an output means, a control computer, and a memory portion coupled to the control computer. The memory portion includes software modules for receiving information as to the primary goal for the task to be performed, for identifying system configuration parameters and system secondary goals, and for configuring a problem statement and a problem solver. The problem statement includes the primary goal, secondary goals, system configuration parameters, data associated with a plurality of system operational variables, and data associated with the status of implementation units communicating with the computer system. The memory portion also includes software for determining expected solver behavior, determining actual solver behavior, and determining whether a solution has been found as well as determining whether to perform a solver iteration step or an adaptation step and performing solver iteration steps and adaptation steps.

In yet another embodiment the system comprises a computer system for problem solving including an input device, a control computer coupled to the output of the input device, and a memory portion coupled to the control computer. The memory portion includes a complexity module for configuring a problem statement coupled to a controllable solving module for calculating actual solver behavior. The memory portion also includes a comparison module for comparing actual solver behavior with expected solver behavior.

In another form the problem solver within the computer system comprises means for receiving a problem statement having primary task goals, secondary task goals, configuration parameters for the computer system, data associated with a plurality of system operational variables, and data associated with the status of implementation units communicating with the computer system. The problem solver also includes means for determining expected solver behavior associated with the problem statement, means for providing configuration parameters for a plurality of problems, means for calculating actual solver behavior, and means for reviewing actual solver behavior to determine if a problem solution has been found. Also present are means for determining whether to perform a solver iteration step or an adaptation step, means for performing solver iteration and adaptation steps, and means for comparing actual solver behavior with expected solver behavior. When a problem solution has been found, means are present to provide the solution to an output device.

In another embodiment, a problem solving method for use in a computer system comprises receiving a problem statement having data associated with a plurality of system operational variables and a plurality of system constraints and configuring the problem statement and a problem solver with configuration parameters. The method determines expected solver behavior associated with the configuration parameters and determines actual solver behavior. Actual solver behavior is reviewed to determine if a problem solution has been found and determine whether to perform a solving iteration step or an adaptation step if a problem solution has not been found. A solver iteration step is performed until an adaptation step is selected. When an adaptation step is selected actual solver behavior and expected solver behavior are compared and the configuration parameters are modified, a new expected solver behavior is determined, a revised actual solver behavior is predicted, and the revised actual solver behavior is reviewed to determine if a problem solution has been found. The adaptation step is repeated until a problem solution is found and a solution statement is transmitted.

In another form, the problem solver is stored via storage media, with the storage media having a first plurality of binary values for receiving a problem statement transmission and storing the problem statement in a first data format. A second plurality of binary values transforms the first data format to a second data format. A third plurality of binary values determines expected solver behavior associated with the second data format. A fourth plurality of binary values determines actual solver behavior associated with the second data format. A fifth plurality of binary values determines if a problem solution has been found. A sixth plurality of binary values determines whether to perform a solver iteration step or perform an adaptation step if a problem solution has not been found. A seventh plurality of binary values compares the expected solver behavior and the actual solver behavior. An eighth plurality of binary values performs a solver iteration step. A ninth plurality of binary values performs a solver adaptation step. A tenth plurality of binary values transmits a solution statement in a third data format.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Figure 1:
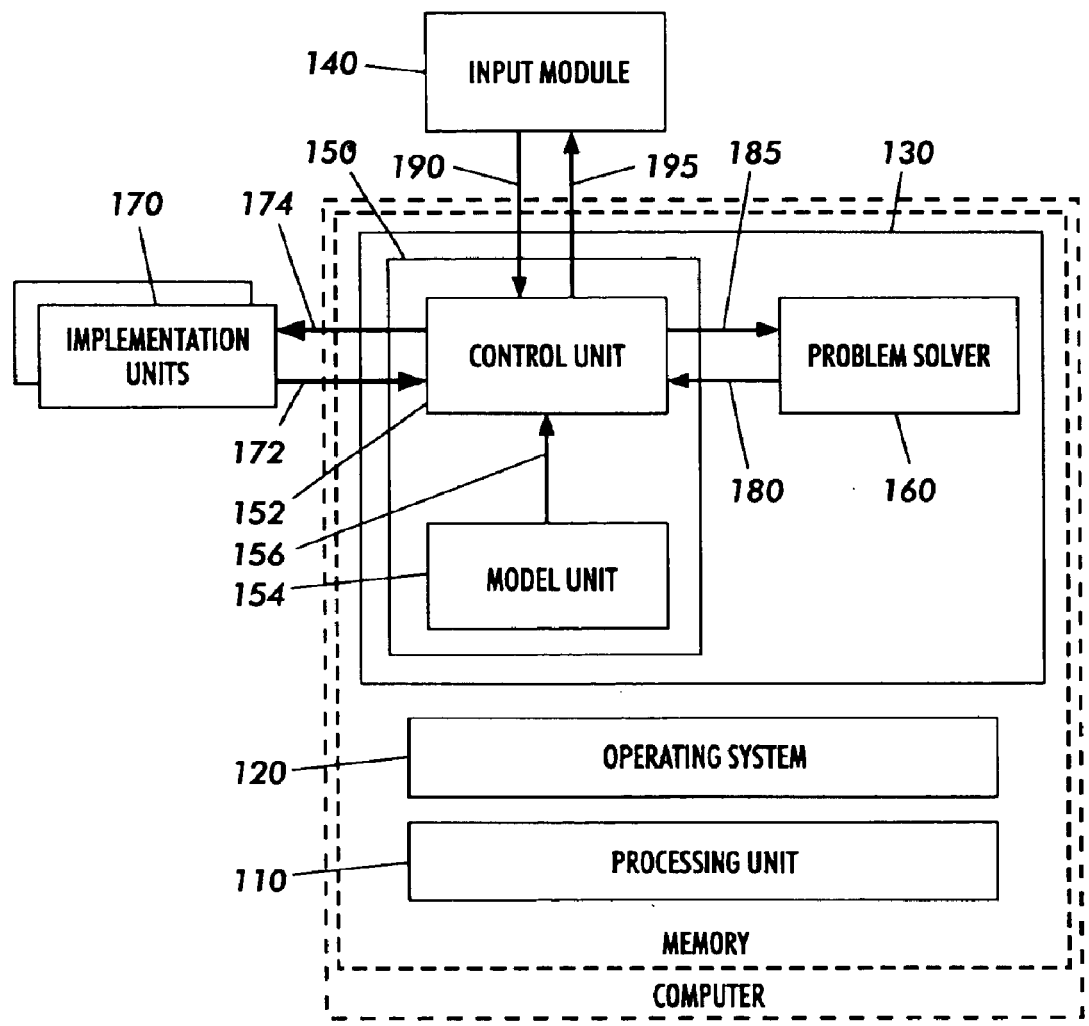
FIG. 1 is a schematic of a representative system incorporating the adaptive constraint solver of the subject invention.

A few research groups have developed adaptive constraint solving approaches. These can be divided into off-line methods that learn the best configuration for a given set of problems and on-line methods for switching between search algorithms in response to poor solver performance. In the off-line learning approach, the learning program is given a solver algorithm, a set of heuristics, a set of problems, and a performance objective function, and it generates a solver configuration (algorithm and heuristics) that performs optimally on the problem set according to the objective. A typical version of on-line adaptation is the algorithm portfolio approach. In one example, the solver has a set of algorithms available that it tries in a fixed order based on performance criteria such as thrashing, as described in J. Borrett, E. P. K. Tsang, and N. R. Walsh, "Adaptive Constraint Satisfaction The Quickest First Principle," *Proc. ECAI'96*, Budapest, Hungary, 1996, pp. 160–164. In another example, the solver switches between different heuristics based on problem-independent performance characteristics that predict how each heuristic should do on a given problem (J. A. Allen and S. Minton, "Selecting the Right Heuristic Algorithm: Runtime Performance Predictors," *Proc. Canadian AI Conference*, 1996). All these approaches have demonstrated the power of adaptation, often leading to considerable performance improvements.

None of these approaches, however, look at characteristics of the problems they adapt to, and indeed they rely on problems in the given set to be relatively uniform relative to heuristics and performance metrics. As a consequence, they adapt to the average problem in the set, they cannot extrapolate to new problems, and they cannot adapt usefully to diverse problem sets or even multiple problem classes. Also, they are inefficient compared to hand-coding, become "trapped" and can't find appropriate solutions, and require operator intervention to achieve convergence to an appropriate solution. These are all properties that are significant for a generic constraint problem solving program. To provide an improved constraint problem solving program, the approach disclosed herein combines off-line and on-line analyses. In this approach, based on phase transition and related analyses, complexity models are generated that link problem characteristics to preferred solver configurations. Additionally, they predict the expected behavior when applying a solver configuration to a problem, which can be used to dynamically adapt the solver and to refine the complexity models if the solver's behavior diverges. This is achieved through analysis of constraint solver behavior in terms of problem-independent, universal parameters such as number of variables, number of constraints, complexity of objective function, complexity of individual constraints, and scaling laws. The problem solver described herein then models the behavior of solver and these parameters and uses this to guide the constraint solver in solving problems. This is then used for decomposition of problems into subproblems, determination of termination criteria, and selection between multiple solution paths.

Various computing environments may incorporate the constraint problem solving program of the invention. The following discussion is intended to provide a brief, general description of suitable computing environments in which the invention may be implemented. Although not required, the invention will be described in the general context of computer-executable instructions, such as program modules, being executed by a networked computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, networked PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Although the adaptive constraint problem solver described herein is not limited to embedded applications, the following discussion will pertain to embedded systems for purposes of example only. One skilled in the art will appreciate that the adaptive constraint problem solver is useful for many complex control problems, generic software solutions to a wide variety of programming problems, flexible programs that separate the model from its solution, and wherever formulation as constraint problems is natural for expression of domain knowledge. Additionally, it may be practiced in a multitude of computing environments.

FIG. 1 illustrates one example of how the constraint problem solving program interacts with selected modules of an embedded computer system that is an integral part of a larger computing system or machine. Embedded systems are used to control, monitor or assist an operation being performed by equipment interfacing with the computer system. Typically, an embedded system is housed on a microprocessor board with Read Only Memory (ROM) for storing the programs and Random Access Memory (RAM) for program execution data. Examples of devices utilizing embedded systems include printers, cameras, watches, microwaves, video cassette recorders, automobiles, engineering tools, process control systems, and office and consumer products. Some embedded systems include an operating system, but many are so specialized that the entire logic can be implemented as a single program. Embedded systems may also be controlled by external software, as in a client/server environment. However, embedded systems present resource constraints, such as less memory and a slower processor, which limit their capabilities. The problem solver described herein is able to operate within these resource constraints and increase the functionality of the system by providing the capability of taking into account a wider array of objectives and constraints for the performance of tasks being directed by the system. It gives the system the flexibility of operating in real time with more complex system constraints than is possible with existing systems.

Numerous types of embedded systems exist which may utilize the various embodiments of the problem solver disclosed herein. One example is the transport of paper along a paper path in a copier or printer. This operation is typically performed by rollers impinging on sheets of paper moving on a paper path through the printer. The rollers are driven by motors, which are controlled by embedded control software which has a specific goal, such as turning on a specific motor at a specific speed at a specific time. This control software is often controlled by higher-level embedded control software. The higher-level control software determines when to turn on the motors for the rollers and at what speed to run them to control when a sheet should enter and leave a specific segment of the paper path. This determination is made through consideration of the motors' constraints, feedback from sensors providing information as to the actual location of the sheet, and reaction to faults, etc. The problem solver disclosed herein provides the capability for such a system to control the interaction and timing of the movement of the components along the paper path more effectively and efficiently.

Another example of an embedded system which benefits from the problem solver is the operation of an airplane, rocket, or spacecraft. These devices have multiple components, which operate cooperatively to control the motion of the vehicle. Typically, control software is provided goals such as timing for firing thrusters and the firing level in the case of a rocket or spacecraft, or how far to move a flap or rudder in the case of an airplane. That specific function embedded control software is controlled by higher-level embedded control software, which has the goal of moving the vehicle along a desired trajectory and from that of calculating what each thruster, flap, and rudder should contribute. To perform a turn, the level of a thruster on one side could be increased or a rudder may be moved or both. These calculations must take into consideration the constraints of the individual devices, such as the existing rudder position. In performing a turn, if a rudder is already moved to a maximum angle, more force may be needed from a thruster. The problem solver disclosed herein provides an embedded software module with the capability of handling more complex system control problems within existing system processor and memory constraints.

A final example of an embedded software system that benefits from the use of the problem solver is the operation of an automobile engine. The firing of an automobile's spark plugs is controlled by software which optimizes the time when a spark plug should fire relative to the movement of the piston. The software is given a goal of firing at a certain periodic rate to drive the automobile at a desired speed, and it controls the spark plug firing, taking into account the dynamic constraints of the pistons.

It will be recognized that a computing environment may include various modules, such as a processing unit, system memory, a system bus coupling various system components to the processing unit, an input/output system, a hard disk drive, an optical disk drive, program modules, program data, monitor, various interfaces, peripheral output devices, and/or networked remote computers. However, for the purpose of clarity, FIG. 1 illustrates only those modules within the computing environment which interact with the constraint problem solving program. In particular, the constraint problem solving program resides within a computing module, which includes a processing unit 110, operating system 120, applications module 130 and memory module. The memory module may be comprised of one or more of disk storage, tape storage, magnetic media, non-volatile memory, EPROM memory, EEPROM memory, FLASH memory, DRAM memory, SRAM memory, ROM, CD memory, computer memory, and/or any like memory system or device. Applications module 130 may perform many possible tasks, such as configuration management, coordination (directing the interaction of multiple hardware components), planning, scheduling, predictive observer (monitoring a hardware component, extrapolating future behavior from past behavior, and outputting the predicted behavior), system control, and diagnostics. The embodiments of the applications module described herein are exemplary only and do not limit the function of the applications module to those specific tasks.

In this embodiment, applications module 130 includes controller module 150 and adaptive constraint problem solver program 160. Within controller module 150 resides control unit 152, which communicates with model unit 154 through path 156. Path 156 provides control unit 152 with instructions concerning the constraints, such as hardware constraints, within the system and secondary goals for the task to be performed, for example conserving energy or maintaining moving parts at a constant velocity. Control unit 152 communicates with input module 140 through input path 190 and output path 195. Input path 190 provides control unit 152 with instructions as to the primary goal or goals of a task to be performed, for example moving a sheet of paper within a specified time frame or coordinating the movement of vehicles geographically. Output path 195 provides input module 140 with feedback as to an error in the execution of the task, such as when the goal or goals could not be achieved. The error specifies the deviation of the actual state or behavior from the goal state or behavior.

The adaptive constraint problem solver program 160 is interconnected to controller module 150 through control paths 180 and 185. Control path 185 provides adaptive constraint problem solver program 160 with the goals and constraints to be imposed on the system and information on the current state of the implementation units. Control path 180 provides control unit 152 with the solution for the problem presented. Control unit 152 is interconnected to various implementation units 170 through sensor path 172 and control path 174. Sensor path 172 provides the controller with information as to the current state of implementation units 170. Control path 174 provides a control signal to implementation units 170 after receipt of the problem solution from adaptive constraint problem solver 160. Additionally, input module 140 may be connected to model unit 154 through an additional input path, not shown, to provide the capability to modify the constraints or secondary goal input from model unit 154 to control unit 152.

Figure 2:
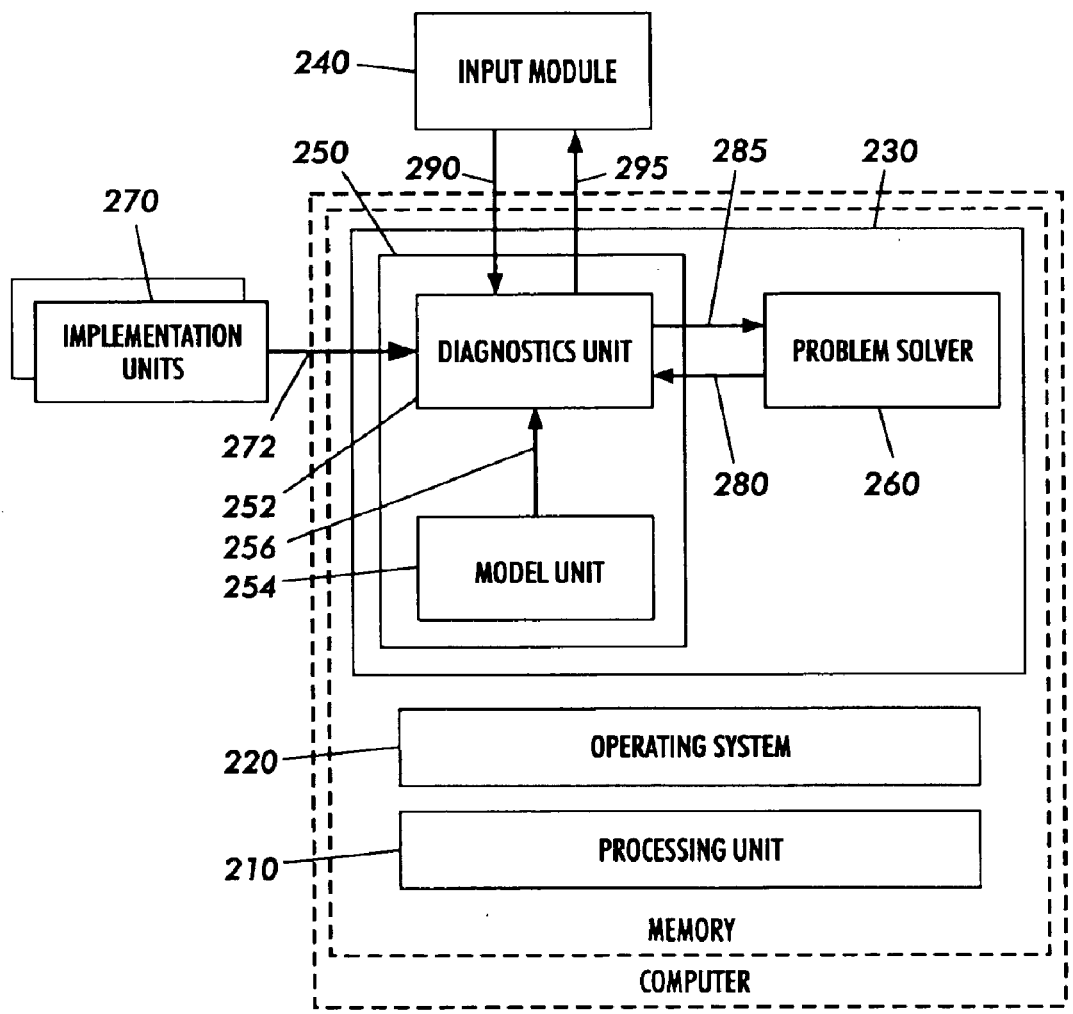
FIG. 2 is a schematic of another representative system incorporating the adaptive constraint solver of the subject invention.

Referring now to FIG. 2, there is shown a second example of how the adaptive constraint problem solver program interacts with modules of a general purpose computing system. Again, for the purpose of clarity, FIG. 2 illustrates only those modules within the computing environment which interact with the constraint problem solving program. Other modules such as those described above may be part of the system. The constraint problem solving program resides within a computing module, which includes a processing unit 210, operating system 220, and applications module 230. In this embodiment, applications module 230 includes diagnostics module 250 and adaptive constraint problem solver program 260. Within diagnostics module 250 resides diagnostics unit 252, which communicates with model unit 254 through path 256. Path 256 provides diagnostics unit 252 with instructions concerning task constraints, such as hardware constraints, within the system and secondary goals for the task to be performed, for example conserving energy. Diagnostics unit 252 communicates with input module 240 through input path 290 and output path 295. Input path 290 provides diagnostics unit 252 with instructions as to the primary fault or faults to be monitored, for example, deviations in the speed of a wheel driven by a motor from the expected speed (because of slippage). Output path 295 provides input module 240 with feedback as to current system status and its deviation from normal behavior. The adaptive constraint problem solver program 260 is interconnected to diagnostics module 250 through paths 280 and 285. Path 285 provides adaptive constraint problem solver program 260 with the goals and constraints to be imposed on the system and information on the current state of the implementation units. Path 280 provides diagnostics unit 252 with the solution for the problem presented. Diagnostics unit 252 is interconnected to various implementation units 270 through sensor path 272. Sensor path 272 provides the diagnostics unit 252 with information as to the current state of implementation units 270.

Figure 3:
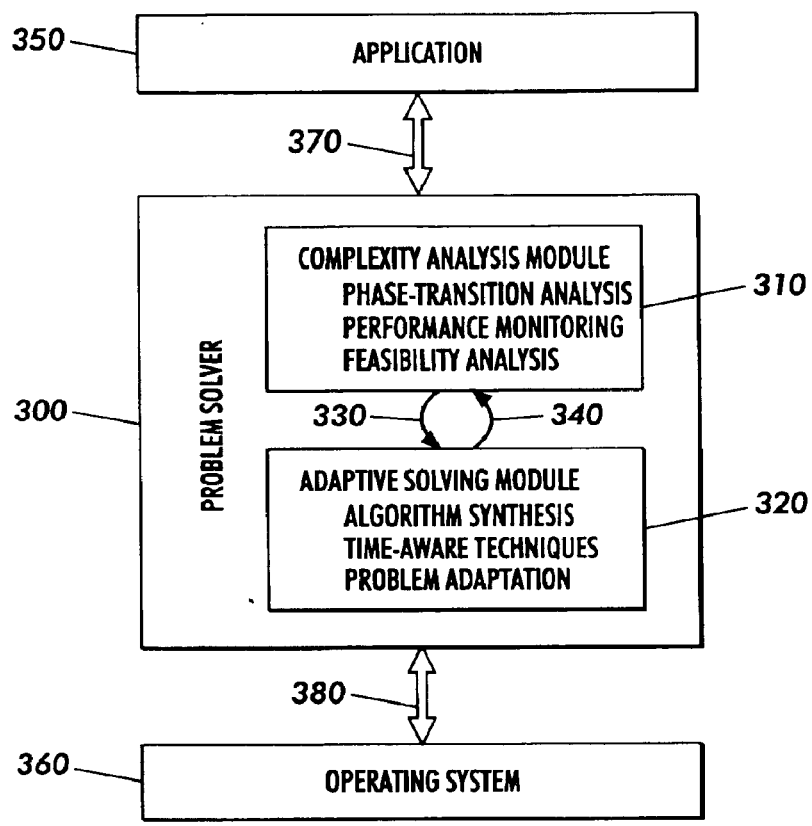
FIG. 3 is a simplified diagram of components for the adaptive constraint solver of the subject invention.

Referring to FIG. 3, there is shown a diagrammatic overview of the components of the adaptive constraint problem solver program according to this invention. Adaptive constraint problem solver program 300 includes complexity analysis module 310 and adaptive solving module 320. Path 330 and path 340 provide a dynamic feedback loop between complexity analysis and adaptive solving, to consider complexity and resources in the solver program. Within complexity analysis module 310, phase transition analysis provides easy-to-compute information about the average complexity of a given problem, which is complemented by on-line performance monitoring and off-line feasibility/worst-case analysis to guarantee solution timeliness and quality.

The average complexity of a given problem is based on problem characteristics such as the ratio of constraints to variables or average variable domain size. If the ratio of constraints to variables is much less than one, the problem is under-constrained, many solutions exist, and a solution is easy to find. If the ratio of constraints to variables is much greater than one, the problem is over-constrained, and it often is easy to show that no solution exists. The difficult problems exist between these two extremes. In principle, it may be possible to use such information to choose solver algorithms and heuristics that have been shown to perform best on a characterized problem. However, it has been shown that this characterization is only correct on average, and that some problems which appear simple may be among the most difficult to solve. Therefore, it is desirable to augment off-line complexity analysis with on-line performance monitoring and problem adaptation in order to provide real-time guarantees in constraint solving.

Within adaptive solving module 320, the adaptive synthesis of global and local search algorithms provides solving efficiency for problems of varying complexities. This synthesis is supported by time-aware constraint propagation and search techniques that balance effort against expected return. These methods to adapt solver algorithms are complemented with techniques to dynamically adapt problem parameters as needed. All of the adaptation methods are based on complexity analysis results and in turn provide the analysis component with actual performance data.

Figure 4:
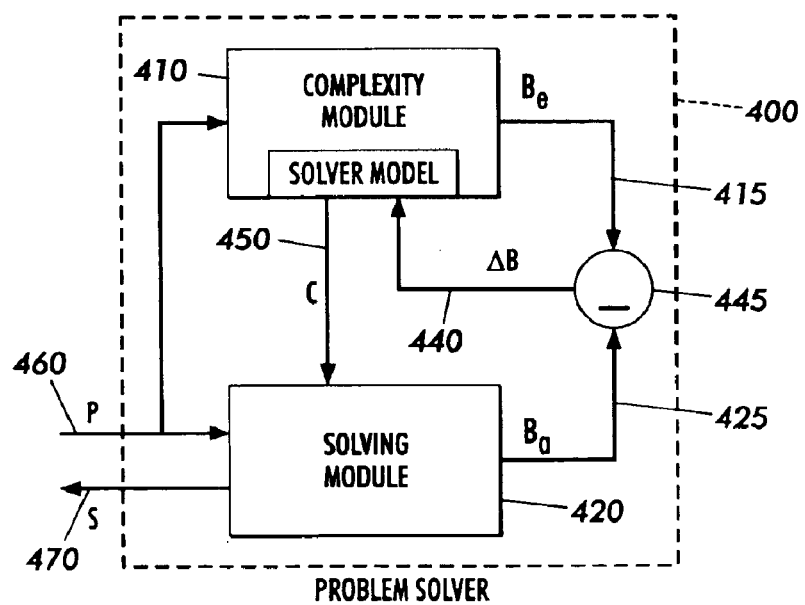
FIG. 4 is a block diagram of one embodiment of the subject invention.

Referring to FIG. 4, there is shown an embodiment of an adaptive constraint problem solver program according to the invention. In this embodiment, problem P is provided to solving module code 420 and complexity module code 410 on path 460. Complexity module code 410 includes solver model 490, which is a data structure, for example a table, which contains configuration parameters C and expected behaviors $B_e$ for different problems P. Path 450 provides solving module code 420 with configuration parameters C, in any known format, for example binary or ASCII. Configuration parameters C may be based on a utility function such as minimal solving time, optimal solution quality, etc. and represent changes in algorithm decision points or adjustment of algorithm parameters. Solver behavior may be time to solution, rate of objective improvement, number of search nodes, density of local minima, solution quality, or any other desired behavior type. Solving module code 420 makes choices in its algorithms that optimize the expected utility, and provide an actual behavior $B_a$ on path 425 to comparison unit 445, which compares actual behavior $B_a$ with expected behavior $B_e$, which complexity module code 410 provides along path 415. Path 440 provides complexity module code 410 with the difference in behavior $\Delta B$ determined by comparison unit 445, through comparison of data strings. For example, behavior may be represented as a single number (solving time so far) or an array of numbers (a history of the values of the objective function, the function being optimized), or a more complicated data structure. The comparison may simply take the difference between the expected and actual solving time values, or compute the rate change of the array of objective function values and take the difference of that from an expected value or any other desired comparison. If necessary, complexity module code 410 then reconfigures the solving module code 420 with new parameters C provided along path 450, and solver model code 490 provides a new expected behavior $B_e$ along path 415 to comparison unit 445. For the solution of a single problem P, the behaviors $B_e$, $B_a$, and $\Delta B$ and the configuration parameters C may be sent and read multiple times during the solving process. The final problem solution is sent to applications module along path 470.

Figure 5:
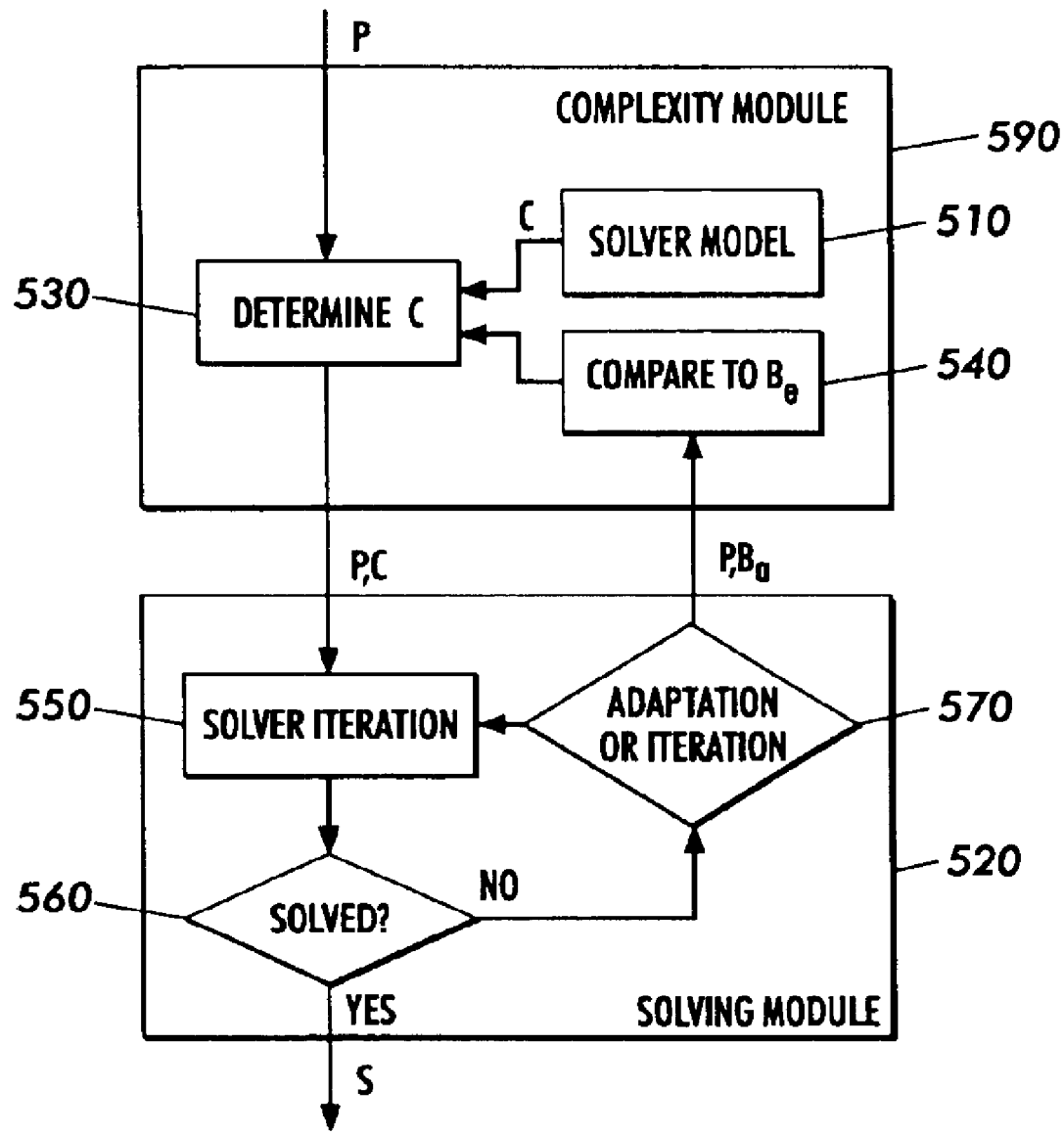
FIG. 5 is a flowchart of the embodiment of FIG. 4.

FIG. 5 illustrates a flow chart, which describes the operation of the system illustrated in FIG. 4. In FIG. 5, problem P and initial configuration parameters C, received from solver model code 590, are sent to step 530, which sends the problem P and the parameters C to step 550 within solving module code 520. For the purpose of illustration, parameters C may specify, among other decision points, how many individual search steps the search method in solver iteration step 550 should execute. Other types of parameters and heuristics C are possible, as will be appreciated by one skilled in the art. At step 550 the solver code attempts to solve the problem P. In this step, the solver code typically searches part of the search space, by using, for example, a gradient-descent, Nelder-Mead, interior-point, depth-first search, or any other technique that is intended to lead the solver towards promising regions of the search space, those regions where optimal valid solutions may be found. Step 550 depends on the type of solver or solvers used, as would be appreciated by one skilled in the art.

Once step 550 has been performed, step 560 checks the result to determine if a solution has been found, which is the case if no constraints are violated by the values of the solution and if no improvement in the objective function is found. If a valid solution has not been found, then the actual solver behavior is routed to step 570, where the performance so far is reviewed. Here, a decision is made as to whether another solver iteration step 550 should be executed, or whether the current status of the problem and the behavior $B_a$ should be sent to the complexity module code for an adaptation step. For example, the solving module code may have a fixed policy of running at least a minimum number of iterations before asking for adaptation. The actual behavior $B_a$ and expected behavior $B_e$ are compared at step 540 and resulting behavior $\Delta B$ is routed back to step 530. If the actual behavior $B_a$ and the expected behavior $B_e$ are different, parameters C are modified at step 530. For example, if the rate of improvement of the objective (specified in $B_a$) is lower than expected (specified in $B_e$), the number of individual search steps specified in C may be increased. The above process is then repeated until a solution is found.

Figure 6:
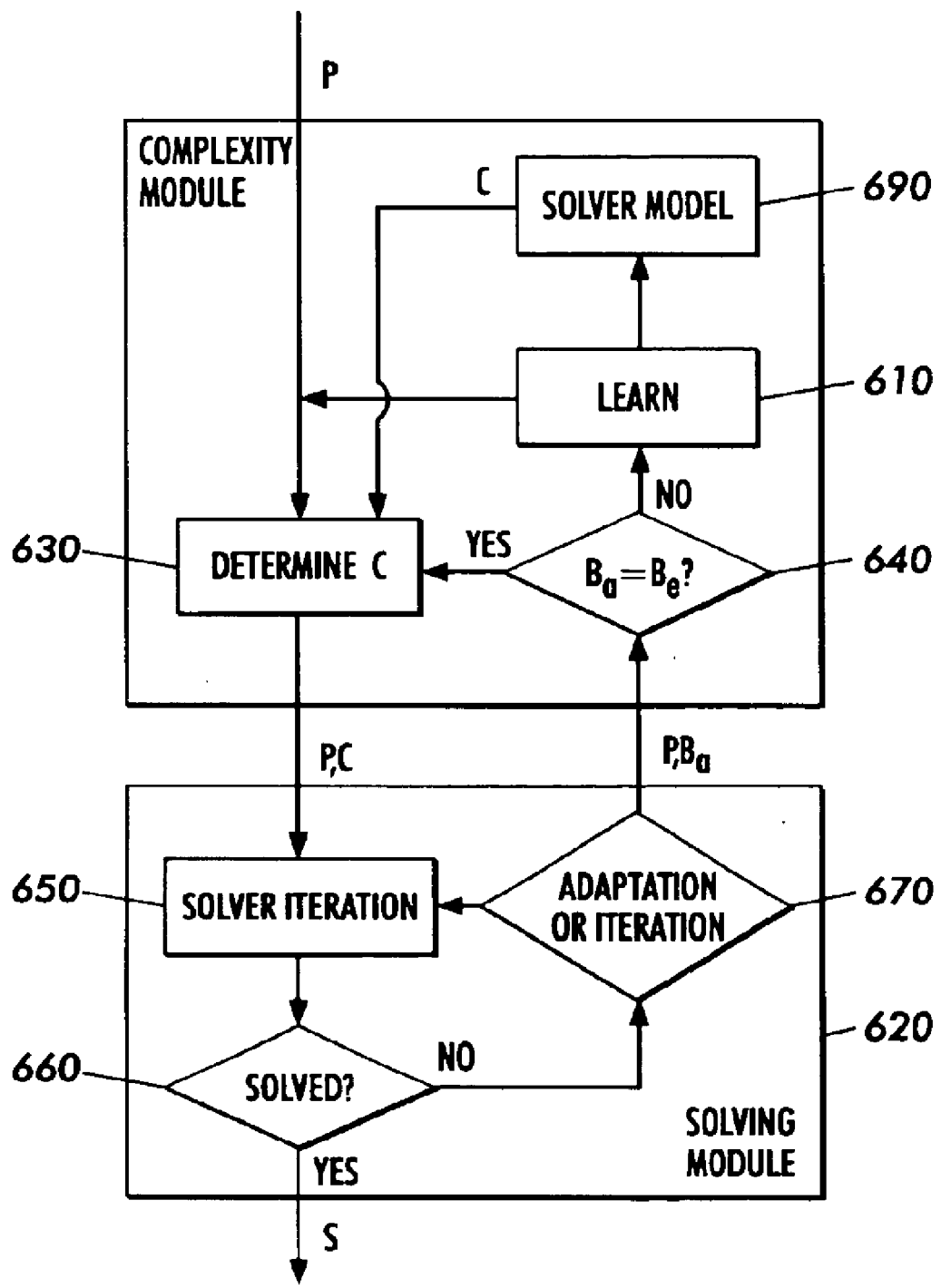
FIG. 6 is a flowchart of an alternate embodiment of the subject invention.

FIG. 6 illustrates a flowchart for an alternate embodiment of the subject invention. In this embodiment, the difference between expected behavior $B_e$ and actual behavior $B_a$ is used to refine the complexity model. At step 630 the problem statement P and initial solver constraints C are received. The solver code then attempts to solve the problem at step 650. If a final result has not been reached, the result is reviewed at step 670. Here a decision is made as to whether another solver code iteration step 650 should be executed, or whether the current status of the problem and the actual behavior $B_a$ should be sent to the complexity module code for an adaptation step. At step 640 actual behavior $B_a$ and expected behavior $B_e$ are compared. If the actual and expected behaviors are different, the difference is provided to step 610, which refines the control parameters provided by solver model code 690 at step 630. For example, if the rate of improvement of the objective (specified in $B_a$) is lower than expected (specified in $B_e$), step 610 may record in solver model code 690 that in the future all problems similar to current problem P should be solved with an increased number of individual search steps, which would be specified in C. Step 610 depends on the type of parameter C to be learned. Possible learning methods include value replacement, reinforcement learning, and any others known in the art. When a solution has been reached, it is sent to the applications module.

Figure 7:
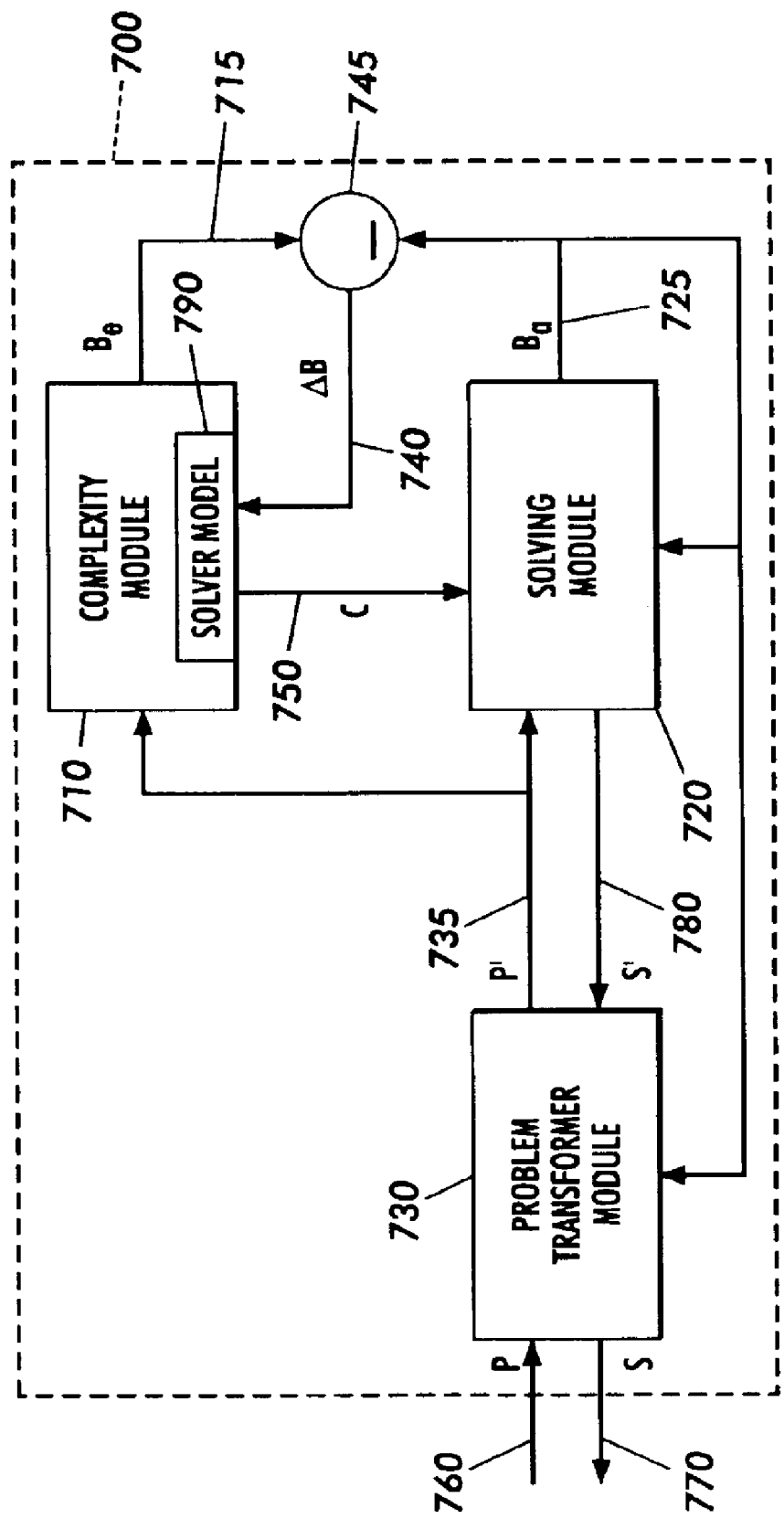
FIG. 7 is a block diagram on another embodiment of the subject invention.

Referring now to FIG. 7, there is illustrated another embodiment of the adaptive constraint problem solver program according to the invention. In this embodiment, the problem P is modified to a problem P' before being given to the adaptive constraint problem solver program. Problem P is provided to problem transformer module code 730 on path 760. Within the problem transformer module code 730, problem P is modified to problem P'. For example, solving module code 720 may consist of a solver for problems with continuous (or real-valued) variables and constraints, but problem P may be a problem with discrete (or integer-valued) variables and constraints.

In order to provide a solving program compatible for all types of problems, the solving module code is adapted in this example by transforming problem P from a discrete to a continuous problem by replacing variables and constraints. Another motivation for transforming the problem is that the problem may be simplified by removing redundant constraints. Problem P' is then provided to solving module code 720 and complexity module code 710 on path 735. Complexity module code 710 includes solver model code 790, which is a data structure, for example a table, which contains configuration parameters C and expected behaviors $B_e$ for different problems P'. Path 750 provides solving module code 720 with configuration parameters C, in any known format, for example binary. Configuration parameters C may be based on a utility function such as minimal solving time, optimal solution quality, etc. and represent changes in algorithm decision points or adjustment of algorithm parameters. Solver behavior may be time to solution, rate of objective improvement, number of search nodes, density of local minima, solution quality, or any other desired behavior type.

Solving module code 720 makes choices in its algorithms that optimize the expected utility, and provide an actual behavior $B_a$ on path 725 to comparison unit 745, which compares actual behavior $B_a$ with expected behavior $B_e$, which complexity module code 710 provides along path 715. Path 740 provides complexity module code 710 with the difference in behavior $\Delta B$ determined by comparison unit 745, through a comparison of data strings. For example, behavior may be represented as a single number (solving time so far) or an array of numbers (a history of the values of the objective function, the function being optimized), or a more complicated data structure. The comparison may simply take the difference between the expected and actual solving time values, or compute the rate change of the array of objective function values and take the difference of that from an expected value or any other desired comparison. If necessary, complexity module code 710 then reconfigures the solving module code with new parameters C provided along path 750, and solver model code 790 provides a new expected behavior $B_e$ along path 715 to comparison unit 745. For the solution of a single problem P, the behaviors $B_e$, $B_a$, and $\Delta B$ and the configuration parameters C may be sent and read multiple times during the solving process. The final problem solution is sent to problem transformer module code 730 along path 780. The solution is modified within problem transformer module code 730, for example it may be changed from a continuous solution to a discrete solution, and is then sent to the applications module along path 770.

Figure 8:
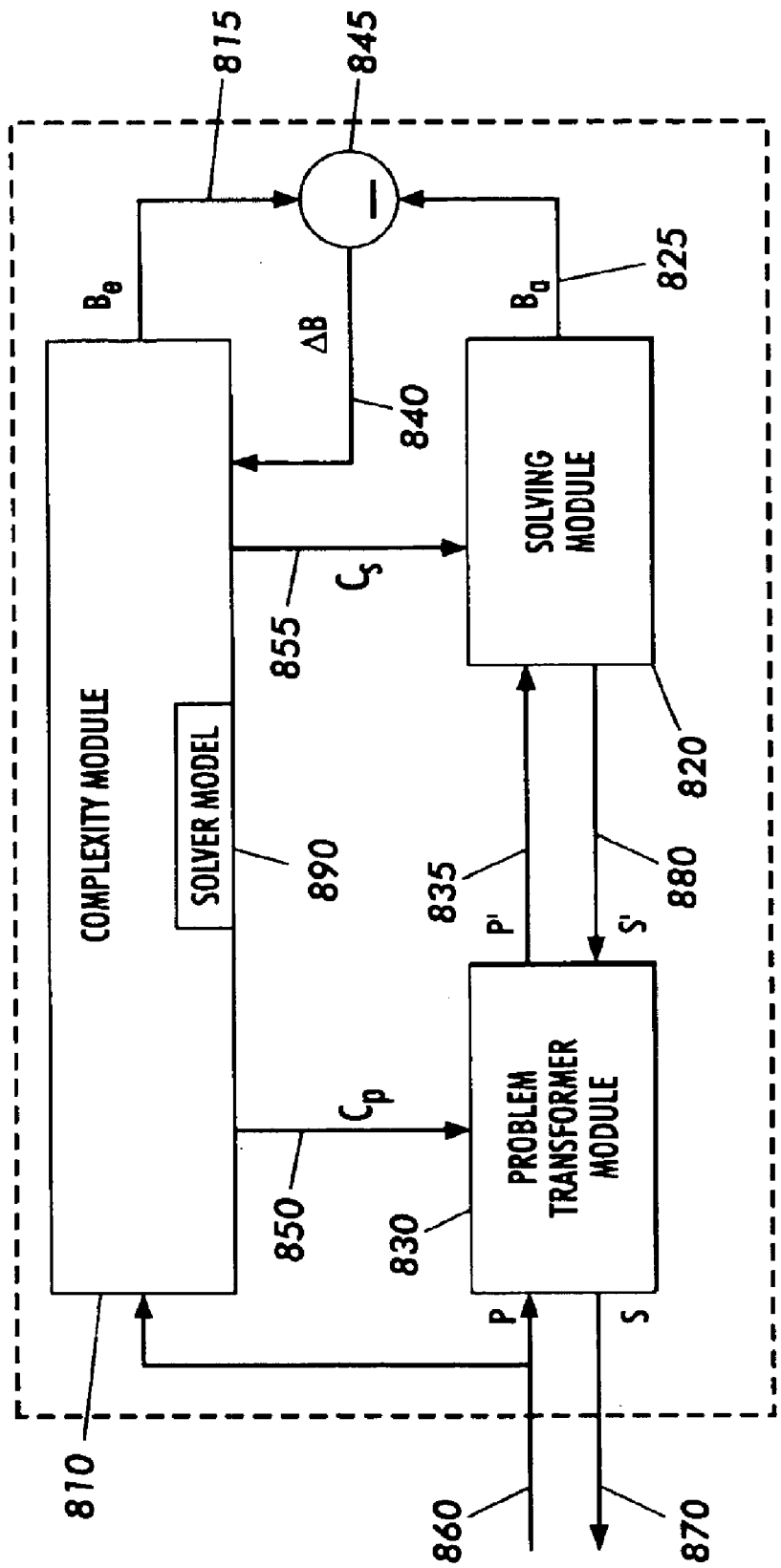
FIG. 8 is a block diagram of an alternate embodiment of the subject invention.

Another embodiment for the adaptive constraint problem solver program with problem adaptation is illustrated in FIG. 8. In this embodiment, the problem P is provided to complexity module code 810 and problem transformer module code 830 by path 860. Complexity module code 810 includes solver model code 890, which is a data structure, for example a table, which contains problem configuration parameters $C_p$, solver configuration parameters $C_s$, expected behaviors $B_e$ for different problems P. Solver configuration parameters $C_s$ are the same as configuration parameters C described above. Problem configuration parameters $C_p$ configure transformer module code 830. For example, one of the parameters in $C_p$ may direct the transformer module to temporarily modify the objective function. Objective functions often encode multiple objectives, one or more of which are the primary objectives, while others are secondary objectives. It is often more difficult to find an optimal solution to such a multi-objective problem than to a single-objective problem. Consequently, based on complexity information recorded in solver model code 890, complexity model code 810 may determine that solving module code 820 should first find an optimal solution for the primary objectives and later try to modify that solution to improve the secondary objectives.

Problem configuration parameters $C_p$ are provided to problem transformer module code 830 on path 850. Thus, within the problem transformer module code 830, problem P is modified to problem P'. Problem P' is then provided to solving module code 820 on path 835. Path 855 provides solution configuration parameters $C_s$ to solving module code 820 in any known format, for example binary. Configuration parameters C may be based on a utility function such as minimal solving time, optimal solution quality, etc. and represent changes in algorithm decision points or adjustment of algorithm parameters. Solver behavior may be time to solution, rate of objective improvement, number of search nodes, density of local minima, solution quality, or any other desired behavior type. Solving module code 820 makes choices in its algorithms that optimize the expected utility, and provide an actual behavior $B_a$ on path 825 to comparison unit 845, which compares actual behavior $B_a$ with expected behavior $B_e$, which complexity module 810 provides along path 815.

Path 840 provides complexity module code 810 with the difference in behavior $\Delta B$ determined by comparison unit 845, through a comparison of data strings. For example, behavior may be represented as a single number (solving time so far) or an array of numbers (a history of the values of the objective function, the function being optimized), or a more complicated data structure. The comparison may simply take the difference between the expected and actual solving time values, or compute the rate change of the array of objective function values and take the difference of that from an expected value or any other desired comparison. If necessary, complexity module code 810 may then reconfigure the transformer module code with new parameters $C_s$ and reconfigure the solving module code with new parameters $C_p$ provided along paths 855 and 850 respectively. Problem transformer code 830 modifies the problem to include secondary objectives as described above, with modified problem P' provided to solving module code 820 by path 835. Solver model code 890 then provides a new expected behavior $B_e$ along path 815 to comparison unit 845. For the solution of a single problem P, the behaviors $B_e$, $B_a$, and $\Delta B$, the configuration parameters $C_s$ and $C_p$, and modified problem P' may be sent and read multiple times during the solving process. The final problem solution is sent to the applications module along path 870.

While the present invention has been illustrated and described with reference to specific embodiments, further modification and improvements will occur to those skilled in the art. For example, any of the embodiments described herein could perform their desired function without the presence of on-line adaptation, the comparison of expected behavior with actual behavior. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A problem solving method for use in a computer system, wherein the computer system includes an applications module having a problem solver, wherein the problem solver comprises a solving module and a complexity module, the method comprising:

receiving a problem statement from the applications module;

configuring the solving module with configuration parameters;

determining an expected solver behavior associated with said configuration parameters for said problem statement;

determining actual solver behavior;

reviewing said actual solver behavior to determine if a problem solution has been found;

determining whether to perform a solver iteration step or to request the complexity module to perform an adaptation step if a problem solution has not been found, wherein said complexity module includes means for detecting non-input-output mapping optimization problems, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement, wherein the complexity module captures previous data on said expected solver behavior as a function of said problem configuration parameters;

performing a said solver iteration step when said solver iteration step is selected, comprising the steps of determining new actual solver behavior and determining whether to repeat said solver iteration step;

repeating said solver iteration step until said adaptation step is selected;

comparing said actual solver behavior with said expected solver behavior when said adaptation step is selected;

requesting the complexity module to perform said adaptation step;

performing said adaptation step, comprising the steps of modifying said configuration parameters within the complexity module, configuring the solving module with said modified configuration parameters, determining expected solver behavior associated with said modified configuration parameters for said problem statement, selecting an algorithm to calculate a revised problem solution, determining a revised actual solver behavior associated with said modified configuration parameters for said problem statement, reviewing said revised actual solver behavior to determine if a problem solution has been found, determining whether to perform said solver iteration step or to request the complexity module to perform another adaptation step if a problem solution has not been found, and repeating said iteration step until said adaptation step is selected;

repeating said adaptation step until a problem solution is found; and providing the solution to the applications module.

2. The problem solving method according to claim 1, further comprising the step of selecting an algorithm to calculate an initial problem solution.

3. The problem solving method according to claim 1, further comprising the step of refining said configuration parameters.

4. The problem solving method according to claim 1, wherein the problem solver comprises an adaptive constraint problem solver.

5. The problem solving method according to claim 1, further comprising the step of transforming said problem statement after receiving said problem statement from the applications module.

6. The problem solving method according to claim 5, further comprising the step of transforming said problem solution before providing said problem solution to the applications module.

7. The problem solving method according to claim 1, wherein said configuration parameters include problem configuration parameters and solver configuration parameters.

8. The problem solving method according to claim 7, further comprising the step of transforming said problem configuration parameters before providing said problem configuration parameters to the solving module.

9. A computer system for problem solving, the system having implementation units communicating with the computer system, the system comprising:

an input device for providing the problem statement;

a computer coupled to the output of said input device includes an applications module having a problem solver, wherein the problem solver comprises a solving module and a complexity module;

a memory portion coupled to said computer, wherein said memory portion includes an applications module having a problem solver, wherein the problem solver includes a solving module and a complexity module, and wherein said complexity module includes means for detecting non-input-output mapping optimization problems, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement, said memory portion comprising:

software for receiving the problem statement from said input device;

software for identifying system configuration parameters and system secondary goals;

software for configuring a problem solver;

software for determining expected solver behavior;

software for determining actual solver behavior and determining whether a solution has been found;

software for determining whether to perform a solver iteration step or to perform an adaptation step, comprising capturing previous data on said expected solver behavior as a function of said problem configuration parameters and performing at least one of performing said solver iteration step, altering said problem definition, changing the optimization algorithm, or requesting additional system resources based on knowledge of optimization behavior; and software for performing an adaptation step, comprising modifying said configuration parameters and reconfiguring said problem solver; and output means for providing a solution statement.

10. The computer system for problem solving according to claim 9, wherein said problem solver comprises an adaptive constraint problem solver.

11. The computer system for problem solving according to claim 9, wherein said memory portion further comprises software including a learning module for refining said expected solver behavior.

12. The computer system for problem solving according to claim 9, further comprising a problem transformer module for transforming said problem statement after receiving said problem statement from said input device.

13. The computer system for problem solving according to claim 9, further comprising a problem transformer module for transforming said problem solution before providing said problem solution to said output device.

14. The computer system for problem solving according to claim 9, wherein said configuration parameters include problem configuration parameters and solver configuration parameters.

15. The computer system for problem solving according to claim 14, further comprising a problem transformer module for transforming said problem configuration parameters before providing said problem configuration parameters to said solving module.

16. The computer system for problem solving according to claim 9, wherein said software for determining expected solver behavior comprises a data structure, said data structure containing configuration parameters and expected behaviors for a plurality of problem types.

17. The computer system for problem solving according to claim 9, wherein said control computer comprises an embedded computer.

18. The computer system for problem solving according to claim 17, wherein said embedded computer system controls at least one operation within a copier or printer.

19. The computer system for problem solving according to claim 17, wherein said embedded computer system controls at least one operation within a process control system.

20. The computer system for problem solving according to claim 17, wherein said embedded computer system controls at least one operation within a diagnostics unit.

21. A computer system for problem solving, the system having implementation units communicating with the computer system, the system comprising:
  an input device for providing the primary goal for the task to be performed;
  a computer coupled to the output of said input device;
  a memory portion coupled to said computer comprising:
  a controllable solving module for calculating actual solver behavior;
  a complexity module coupled to said controllable solving module, for configuring a problem statement, wherein said complexity module includes means for detecting non-input-output mapping optimization problems, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement, and wherein the complexity module captures previous data on said expected solver behavior as a function of said problem configuration parameters; and
  a comparison module for comparing said actual solver behavior with expected solver behavior; and
  output means for providing a solution statement.

22. The computer system for problem solving according to claim 21, wherein said problem solver comprises an adaptive constraint problem solver.

23. The computer system for problem solving according to claim 21, further comprising a learning module for refining said expected solver behavior.

24. The computer system for problem solving according to claim 21, further comprising a problem transformer module for transforming said problem statement after receiving said problem statement from said input device.

25. The computer system for problem solving according to claim 21, further comprising a problem transformer module for transforming said problem solution before providing said problem solution to said output means.

26. The computer system for problem solving according to claim 21, wherein said configuration parameters include problem configuration parameters and solver configuration parameters.

27. The computer system for problem solving according to claim 26, further comprising a problem transformer module for transforming said problem configuration parameters before providing said problem configuration parameters to said solving module.

28. The computer system for problem solving according to claim 21, wherein said complexity module a data structure, said data structure containing configuration parameters and expected behaviors for a plurality of problem types.

29. The computer system for problem solving according to claim 21, wherein said control computer comprises an embedded computer system.

30. The computer system for problem solving according to claim 29, wherein said embedded computer system controls at least one operation within a copier or printer.

31. The computer system for problem solving according to claim 29, wherein said embedded computer system controls at least one operation within a process control system.

32. The computer system for problem solving according to claim 29, wherein said embedded computer system controls at least one operation within a diagnostics unit.

33. A problem solver within a computer system, said problem solver comprising:
  means for receiving a problem statement;
  means for determining expected solver behavior associated with said problem statement;
  means for providing configuration parameters for a plurality of problems;
  means for calculating actual solver behavior;
  means for reviewing said actual solver behavior to determine if a problem solution has been found;
  means for determining whether to perform a solver iteration step or to request an adaptation step if a problem solution has not been found, comprising a complexity module, wherein said complexity module includes means for detecting non-input-output mapping optimization problems, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement, and wherein said complexity module captures previous data on said expected solver behavior as a function of said problem configuration parameters;
  means for performing a solver iteration step, comprising performing another search step, calculating a revised actual solver behavior and determining whether to repeat said solver iteration step;
  means for comparing said actual solver behavior with said expected solver behavior;
  means for requesting performance of an adaptation step;
  means for performing an adaptation step, comprising modifying said configuration parameters, determining a revised expected solver behavior, and providing said modified configuration parameters and said revised expected solver behavior to said means for performing a solver iteration step; and
  means for providing the problem solution to an output device.

34. A problem solving method for use in a computer system comprising the steps of:
  receiving a problem statement;
  configuring the problem solver with configuration parameters;
  determining expected solver behavior associated with said configuration parameters for said problem statement;

determining actual solver behavior;

determining if a problem solution has been found;

determining, within a complexity module, whether to perform a solving iteration step or an adaptation step if a problem solution has not been found, wherein said complexity module includes means for detecting non-input-output mapping optimization problems, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement, and wherein said complexity module captures previous data on said expected solver behavior as a function of said problem configuration parameters;

performing said solver iteration step, when said solver iteration step is selected, comprising the steps of determining a new actual solver behavior and determining whether to repeat said iteration step;

repeating said solver iteration step until said adaptation step is selected;

comparing said actual solver behavior with said expected solver behavior when said adaptation step is selected;

performing said adaptation step, comprising the steps of modifying said configuration parameters, determining expected solver behavior associated with said modified configuration parameters, determining a revised actual solver behavior, reviewing said revised actual solver behavior to determine if a problem solution has been found, determining whether to perform said solver iteration step or to perform another adaptation step if a problem solution has not been found, and repeating said iteration step until said adaptation step is selected;

repeating said adaptation step until a problem solution is found; and transmitting a solution statement.

35. The problem solving method according to claim 34, wherein said problem solving method comprises an adaptive constraint problem solving method.

36. The problem solving method according to claim 34, further comprising the step of refining the control parameters.

37. The problem solving method according to claim 34 further comprising the step of transforming said problem statement.

38. The problem solving method according to claim 34, further comprising the step of transforming said problem solution.

39. The problem solving method according to claim 34, wherein said configuration parameters include problem configuration parameters and solver configuration parameters.

40. The problem solving method according to claim 39, further comprising the step of transforming said problem configuration parameters.

41. The problem solving method according to claim 34, further comprising the step of selecting an algorithm for calculating a problem solution.

42. An article of manufacture comprising a computer usable medium having computer readable program code embodied in said medium which, when said program code is executed by said computer causes said computer to perform method steps for problem solving for use in a computer system, wherein the problem solver includes a solving module and a complexity module, said method comprising:

receiving a problem statement from the applications module;

configuring the solving module with configuration parameters;

determining an expected solver behavior associated with said configuration parameters for said problem statement;

determining actual solver behavior;

reviewing said actual solver behavior to determine if a problem solution has been found;

determining whether to perform a solver iteration step or to request the complexity module to perform an adaptation step if a problem solution has not been found, wherein said complexity module includes means for detecting non-input-output mapping optimization problems, means for estimating rate of improvement bounds, and means for selecting a complexity related action, wherein said complexity related action comprises selecting at least one member from the group consisting of returning an error, accepting the best result possible for fixed computational resources, adding computational resources, and changing the problem statement, and wherein the complexity module captures previous data on said expected solver behavior as a function of said problem configuration parameters;

performing a said solver iteration step when said solver iteration step is selected, comprising the steps of determining new actual solver behavior and determining whether to repeat said solver iteration step;

repeating said solver iteration step until said adaptation step is selected;

comparing said actual solver behavior with said expected solver behavior when said adaptation step is selected;

requesting the complexity module to perform said adaptation step;

performing said adaptation step, comprising the steps of modifying said configuration parameters within the complexity module, configuring the solving module with said modified configuration parameters, determining expected solver behavior associated with said modified configuration parameters for said problem statement, selecting an algorithm to calculate a revised problem solution, determining a revised actual solver behavior associated with said modified configuration parameters for said problem statement, reviewing said revised actual solver behavior to determine if a problem solution has been found, determining whether to perform said solver iteration step or to request the complexity module to perform another adaptation step if a problem solution has not been found, and repeating said iteration step until said adaptation step is selected;

repeating said adaptation step until a problem solution is found; and providing the solution to the applications module.

\* \* \* \* \*